Patented Sept. 13, 1932

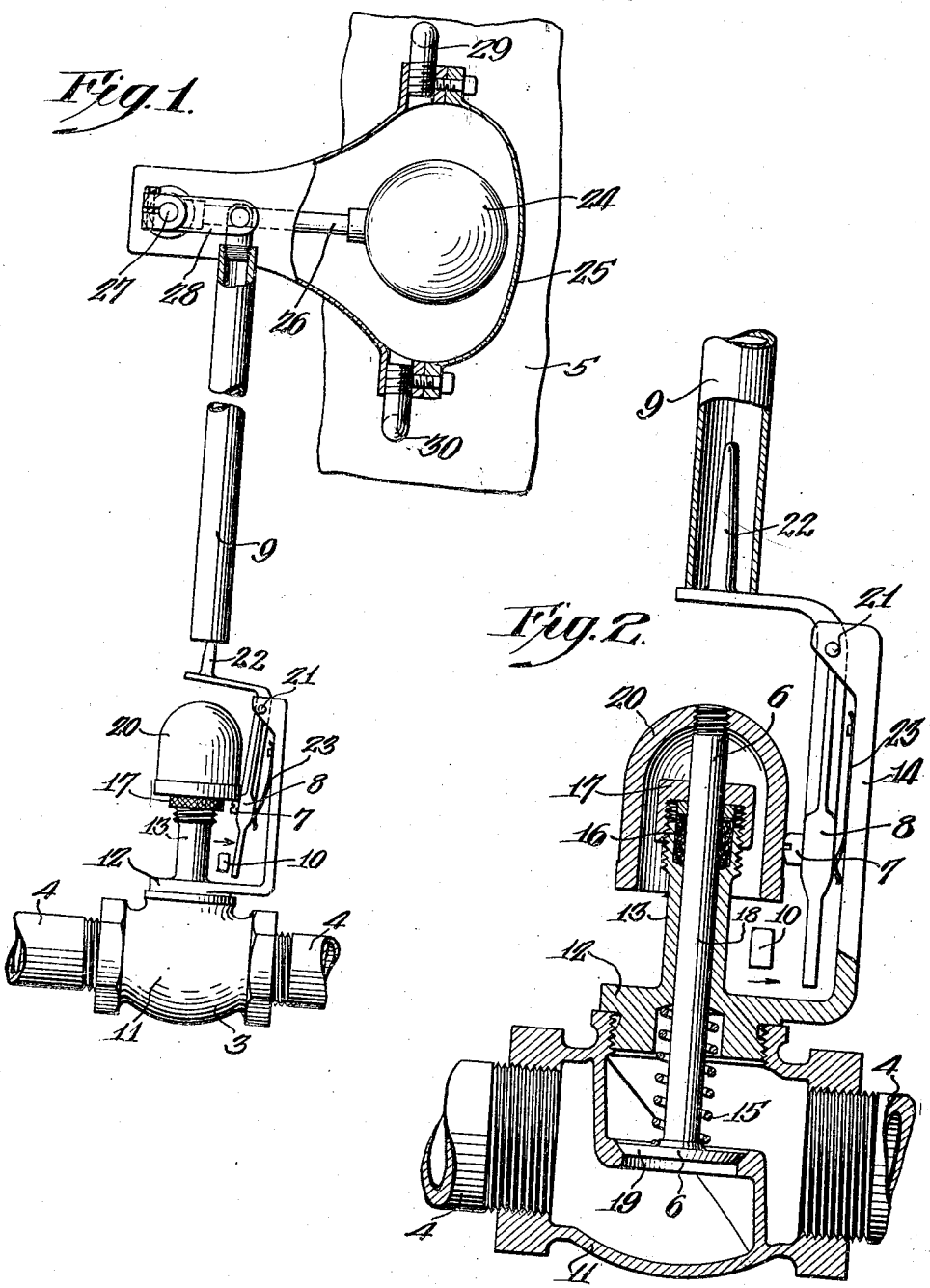

1,877,349

UNITED STATES PATENT OFFICE

EDWARD W. MEARS, OF MERION, PENNSYLVANIA, ASSIGNOR TO MEARS-KANE-OFELDT, INC., OF PHILADELPHIA, PENNSYLVANIA, A CORPORATION OF PENNSYLVANIA

AUTOMATIC SHUT-OFF MECHANISM

Application filed July 3, 1931. Serial No. 548,501.

The present invention may be considered to some extent a development of mechanism forming the subject matter of U. S. Patent No. 1,288,149 entitled "Automatic low water fuel shut-off" and relates to shut-off mechanism.

While intended to be applied to any purpose to which it may be adapted it is believed the invention will have its best and widest application for the automatic shut-off of a fuel line to a boiler responsive to undesirably low water in the boiler, with or without an adaptation to effect the shut-off, also by thermostatic or other means, as in the event of any momentary stoppage in the fuel supply to the line.

One purpose of the invention is to provide mechanism of the character indicated, easy and inexpensive to manufacture and well suited to the needs of service.

A further purpose is to shield the packing gland and stem of an automatic emergency shut-off valve from moisture and dust, thereby protecting the valve from danger of it sticking open in release, even though the automatic release to effect valve closure may come only between indefinitely long intervals.

A further purpose is to surround the outer portions of the packing gland and stem of an automatic emergency shut-off valve with an external annular inwardly directed hood, mounted at its outer end upon the outer end of the valve stem, forming a portion of the valve unit and preferably coaxial with the valve stem.

A further purpose is to provide a bell crank release latch pivoted near the outer end of an inwardly pressing valve unit with a release arm making engagement with an automatic release member in the extended axis of the valve stem.

A further purpose is to provide a novel bonnet assembly adapted to use with standard commercial valve bodies, making the assembly interchangeable with the usual bonnet of the commercial valve for the easy conversion of an ordinary screw closure valve into an automatic release to closure type of valve, adapted to be latched normally open, and to close automatically under emergency by the release of the latch effected by an element responsive to the undesirable abnormal condition making the emergency.

A further purpose is to avoid need for accommodation between the angular positions of the valve bonnet and of a release member by effecting the release in the extended axis of the valve unit, permitting angular variation in the position of the bonnet to best accommodate other conditions, that may be with respect to the requirements of another automatic release element having an effective engagement at a point offset from the stem axis or be merely to permit the bonnet to be screwed home without need for any definite angular registry with respect to the first release member.

A further purpose is to mount a bell crank upon a bracket portion of a valve bonnet in a way adapting a lateral projection upon a downward arm of the bell crank to latch under a downwardly directed hood surrounding the outer portion of the packing gland and carried by the outer end of the valve stem and to provide an upward extension from a horizontal arm of the bell crank to lie substantially coaxial with the stem, to receive and guide a release element equally well at variant angular positions of the bonnet.

Further purposes will appear in the specification and in the claims.

I have elected to show one form only of my invention, selecting a form that is practical and efficient in operation and which well illustrates the principles involved.

Figure 1 is a side elevation of mechanism embodying a desirable form of my invention, and illustrates an automatic cut-off valve in a fuel line to a boiler or the like, with the valve unit latched open and operatively connected to release mechanisms.

Figure 2 is a view corresponding to a portion of Figure 1 in longitudinal section in the plane of the paper, and with parts in a different position, the valve unit being latched open in Figure 1 and closed in Figure 2.

Like numerals refer to like parts in all figures.

Describing in illustration and not in limitation and referring to the drawing:—

In the illustration, an automatic shut-off valve 3 in a fuel supply line 4 of the boiler 5 has a valve unit 6 latched open by a projection 7 on a bell crank rocker 8, and is subject to an emergency release for automatic closure by an emergency downward movement of a member 9 or by an emergency lateral movement (in the direction of the arrow) of a member 10.

The members 9 and 10 are intended to be connected in any suitable way, to move responsively to any selected different emergency conditions under which it is undesirable for the valve to remain open.

More usually these conditions under which there is to be a safety shut-off of the valve include any dangerously low water in the boiler or any inadvertent failure of the fuel supply to the pipe 4.

The member 9 while optionally comprising any member adapted to move responsively to selectively variant emergency conditions has been shown in the illustration to operate by mechanism responsive to dangerously low water in the boiler, in that some features of the invention are in advantageous combination with this specific type of latch-releasing mechanism.

The member 10 however is illustrated in fragment only intended for a conventional indication of an operating portion of any one of a number of commercial devices already on the market controlled thermostatically or otherwise to operate if the fuel supply to the pipe 4 fails.

The shut-off valve 3 comprises a body 11 and a bonnet assembly, the body suitably comprising the unchanged standard body of a commercial valve with the bonnet assembly mounted thereon interchangeably with the usual bonnet assembly of a standard valve.

The bonnet assembly includes the bonnet, connected in any usual or suitable way to the body, a valve unit, a latch and springs for respectively retracting the valve unit inwardly to closure and for holding the latch to its duty.

The bonnet comprises a usual base 12 and valve stem housing 13 that may be the same as the corresponding members of a usual bonnet, and a bracket 14 laterally spaced from and suitably parallel to the housing 13, the bracket supporting the latch mechanism.

The coaxial base and housing are bored longitudinally for the valve stem and counterbored at the inner and outer ends of the bore to respectively receive the compressed spring 15 that downwardly retracts the valve unit and packing washers 16 held to place by a suitable screw gland cap 17.

The valve unit 6 comprises a stem 18, slidable in the bore of the housing with a valve 19 at its inner end and an inwardly directed hood 20 at its outer end.

The inwardly directed hood 20, rigidly and preferably coaxially fastened at its outer end to the outer end of the stem is suitably a casting. Its annular wall surrounds and shields the outer end of the stem and the opening to the packing around the stem from dust and drippage, and its inwardly directed end provides an abutment for engagement by the latch member 7 on the bell crank 8.

The annular nature of this abutment permits a free angular movement of the valve unit on its own axis without affecting the proper operation of the latching mechanism.

The bell crank 8 pivoted at 21 on the outer end of the bracket has a downward arm carrying the latch projection 7, and a lateral arm for engaging the release member 9 in the extended axis of the valve unit, the lateral arm carrying a bayonet 22 that extends approximately axially of the valve unit and provides a loose guiding connection with the release member 9.

The latch projection 7 is illustrated as the head of a screw though obviously this projection and other portions of the bell crank may be integral portions of a single casting.

The downward arm of the bell crank 8 desirably extends suitably beyond the projection 7 to provide an engagement surface for the laterally operating release member 10.

The latch member is spring pressed to its duty by a suitable spring 23 carried on the bracket. Though other means may be used than the spring for effecting this resilient urge in counterclockwise (Figures 1 and 2) direction, we have found the spring a little superior to any other means tried in that it is less effected by floor vibrations.

In the illustration a float 24 within a suitable float chamber 25 is carried at the end of an arm 26 rigidly fastened to a shaft 27 that is journalled in the wall of the chamber and extends outside the chamber to carry rigidly connected to it an arm 28 that in turn carries the downwardly extending sleeve link 9.

It will be seen that the vertical position of the link 9 depends upon the water level within the chamber 25 and therefore upon that within a boiler 5 to which the chamber is connected at 29 and 30 respectively above and below the water level of the boiler.

In the event of abnormally low water in the boiler the abnormally low position of the float brings the link 9 into operative engagement with the rocker 8 to release the valve unit for automatic valve closure.

The release member 10 may be responsive to a thermostat and effect latch release and valve closure irrespective of the condition of the water in the boiler if the gas supply in the fuel line should fail.

It moves in a direction to release the latch if the abnormal condition becomes present, this direction being that indicated by the arrow.

A particularly desirable feature of the invention is the locating of the operating portion of the lateral arm of the bell crank 8 in the extended axis of the valve unit which permits the angular position of the bonnet assembly to be varied to best accommodate other conditions either with respect to the location of any other release member 10 operating at a portion of the latch that is laterally offset from the axis or merely to avoid any need for definite angular registry of the bonnet assembly when fastened to the valve.

Desirably the valve assembly is made interchangeable with bonnets of standard commercial valves, the body portion 11 of the valve varying in any usual or suitable way, usually without involving need for any change whatever in the bonnet assembly.

It will be understood that the automatic shut-off valve 3 is usually an emergency safety device and during normal use there may be very long periods during which the device is on duty but forgotten.

This makes it very desirable that when the emergency finally does come there may be no danger of the valve unit sticking open after release and in the past there has been this danger incident to moisture and dirt settling into the connection between the stem and gland.

When used as illustrated there has been frequently drippage from the float chamber, water seeping outwardly along the shaft 27 to eventually drip from the operating link 9 on to the release valve.

In the past this drippage and dust has so worked in along the stem of the valve as to result in a deleterious sticking wholly avoided by the hood 20 of the present invention, any such dripping as well as settling dust being effectively shielded by the hood from the valve stem.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In automatic valve shut-off mechanism including a valve unit having an axis and resiliently pressed longitudinally inwardly when latched from inward movement at an outward open valve position, a latch, a movable lever carried by the latch and having an arm extending into line with the extended axis of the unit and releasing the latch when pressed longitudinally inwardly by a release member at the said axis and means for supporting the lever to permit and control the character of movement of the lever.

2. In automatic valve shut-off mechanism including a valve unit having an axis and resiliently pressed longitudinally inwardly when latched from inward movement at an outward open valve position, a bell crank latch release pivoted near the outer end of the unit at a point laterally offset therefrom and having an inwardly extending arm latching with the unit and a release arm beyond the outer end of the unit adapted to be engaged and inwardly deflected at the extended axis of the unit to release the latch.

3. In mechanism of the character indicated, a bonnet having a longitudinally bored body, a valve stem housed therein, a valve carried on the inner end of the stem and an inwardly directed annular hood upon the outer end of the stem substantially coaxial with the stem and having an annular wall radially spaced, for a portion of its return length, from the body, and a bell crank lever having a pivot support near the outer end of the hood laterally offset therefrom, said bell crank including an inwardly extending arm, a projection thereon to latch in front of the inner edge of the hood and a second arm for automatic release of the latch presenting an engagement surface to a release member in line with the extended axis of the stem.

4. In mechanism of the character indicated, a bonnet having a longitudinally bored body, a valve stem housed therein, a valve on the inner end of the stem and an inwardly directed annular hood carried at its outer end on the outer end of the stem substantially axial with the stem and radially spaced for a portion of its return length from the body, a bracket extension from the bonnet laterally offset from the body and a bell crank lever having a pivot support from the extension near the outer end of the hood laterally offset therefrom, said bell crank including an inwardly extending arm, a projection thereon to latch in front of the inner edge of the hood and a second arm for automatic release of the latch presenting an engagement surface to a release member in line with the extended axis of the stem.

5. In an automatic valve shut-off mechanism including a valve unit having an axis and resiliently pressed longitudinally inwardly when latched from inward movement in an outward open valve position, a bell crank release latch pivoted near the outer end of the unit at a point laterally offset therefrom and having an inwardly extending arm latching with the unit and a release arm beyond the outer end of the unit adapted to be engaged and inwardly deflected in line with the extended axis of the unit to release the latch, and including a bayonet extension generally axial of the unit for making a loose guiding connection with the release member.

6. In mechanism of the character indicated, a bonnet, a vertically movable valve unit having an axis and resiliently pressed inwardly and downwardly to closure including a stem housed in the bonnet, a valve on the inner and lower end thereof and a downwardly directed hood on the outer and upper end thereof, a low water responsive link above the hood generally axial with the stem, and a latch for holding the unit in raised position, and having a release arm presenting an engagement surface to the lower end of the link in said axis, the hood shielding the stem and the gland thereof from any drippage from the link.

7. In mechanism of the character indicated, a bonnet assembly including a bonnet having a bored body and a bracket laterally spaced from the body, a stem housed in the body, a valve on the inner end of the stem, an inwardly directed annular hood upon the outer end thereof and a bell crank latch having a pivot upon the bracket near and laterally offset from the outer end of the hood, having a release arm presenting an operating terminal in the extended axis of the stem and a latch arm generally inwardly from the pivot having a projection adapted to latch in front of the hood when the stem is in its outward position and means for pressing the valve inwardly.

EDWARD W. MEARS.